(12) United States Patent
Pailler et al.

(10) Patent No.: US 9,908,539 B2
(45) Date of Patent: Mar. 6, 2018

(54) REMOVABLE TABLE WITH A REDUCED BULK, IN PARTICULAR FOR A RAILWAY VEHICLE

(71) Applicant: ALSTOM TRANSPORT TECHNOLOGIES, Saint-Ouen (FR)

(72) Inventors: Christophe Pailler, Salles sur Mer (FR); Jean-Christophe Marconnot, Saint Xandre (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 0 days.

(21) Appl. No.: 15/254,005

(22) Filed: Sep. 1, 2016

(65) Prior Publication Data
US 2017/0066456 A1 Mar. 9, 2017

(30) Foreign Application Priority Data

Sep. 3, 2015 (FR) ..................... 15 58176

(51) Int. Cl.
| | | |
|---|---|---|
| *A47B 23/00* | (2006.01) | |
| *B61D 37/00* | (2006.01) | |
| *A47B 5/06* | (2006.01) | |
| *A47B 5/04* | (2006.01) | |
| *A47B 5/02* | (2006.01) | |
| *B60P 3/36* | (2006.01) | |
| *B63B 29/06* | (2006.01) | |

(52) U.S. Cl.
CPC ............... *B61D 37/00* (2013.01); *A47B 5/02* (2013.01); *A47B 5/04* (2013.01); *A47B 5/06* (2013.01); *B60P 3/36* (2013.01); *B63B 29/06* (2013.01)

(58) Field of Classification Search
CPC ....................................... A47B 5/06
USPC ................ 108/42, 48, 167, 168, 171, 172
See application file for complete search history.

(56) References Cited

U.S. PATENT DOCUMENTS 1,377,102 A * 5/1921 Stambaugh ............ A47B 3/087
                                                              108/171
1,444,645 A * 2/1923 Steinus .................. A47B 3/087
                                                              108/171

(Continued)

FOREIGN PATENT DOCUMENTS

| CN | 203511671 | 4/2014 |
|---|---|---|
| DE | 4026391 | 2/1992 |
| DE | 10010748 | 9/2001 |

OTHER PUBLICATIONS

Search Report dated Apr. 19, 2016; Application No. FR 1558176.

*Primary Examiner* — Matthew W Ing
(74) *Attorney, Agent, or Firm* — Young & Thompson

(57) ABSTRACT

The table (10) includes a plate (12) extending, in a longitudinal direction, between a first lateral edge (12A) bearing first removable attachment elements (14) to a lateral wall of the compartment, and a second free lateral edge (12B), and a central leg (18) extending between a first end (18A) connected to the plate and a second end (18B) including second removable attachment elements (20) to the floor of the compartment. The first end of the central leg is connected to the plate through a pivot connection (26) allowing pivoting of the central leg for folding it back towards one of the first or second lateral edges of the plate, and the plate includes, at the other one of the first or second lateral edges of the plate, at least one supporting member (28) on which the plate is intended to be supported when the plate is laid on the floor.

10 Claims, 1 Drawing Sheet

(56) References Cited

U.S. PATENT DOCUMENTS

| | | | | |
|---|---|---|---|---|
| 2,010,855 | A | * | 8/1935 | Fuller ................. A47B 17/036 108/171 |
| 3,635,516 | A | | 1/1972 | Commans |
| 4,803,930 | A | * | 2/1989 | Crocoli ................... A47B 5/06 108/117 |
| 6,752,091 | B2 | * | 6/2004 | Glover .................. A47B 3/087 108/129 |
| 8,430,041 | B2 | * | 4/2013 | Moronval ................ A47B 3/00 108/115 |
| 8,827,386 | B1 | * | 9/2014 | Kennard ................ A47B 77/10 108/48 |

* cited by examiner

REMOVABLE TABLE WITH A REDUCED BULK, IN PARTICULAR FOR A RAILWAY VEHICLE

FIELD OF THE INVENTION

The present invention relates to a removable table for a room, namely a compartment of passengers of a public transport vehicle, more particularly a railway vehicle.

BACKGROUND OF THE INVENTION

Such a removable table includes a plate extending in a longitudinal direction between a first lateral edge bearing first removable attachment means to a lateral wall of the compartment and a second free lateral edge, and a central leg extending between a first end connected to the plate and a second end comprising second removable attachment means to the floor of the compartment.

In certain cases, it is necessary to reorganize the arrangement of the tables and seats of the compartment, in order to adapt it to the direction of circulation of the public transport vehicle. For this purpose, the table is disassembled by deactivating its first and second removable attachment means, and then it is displaced towards another point of the compartment so as to be reassembled therein.

Such a table is relatively cumbersome, so that two operators are generally necessary for displacing the table from one point to another of the compartment. Further, because of this congestion, the table during its transport risks impacting against other elements of the compartment, for example other tables or seats, which may have the effect of damaging the table or these other elements.

SUMMARY OF THE INVENTION

The object of the invention is namely to find a remedy to this drawback, by providing a removable table of the aforementioned type for which transport in the compartment is facilitated.

For this purpose, the object of the invention is namely a removable table for a compartment, namely a compartment of public transport vehicle passengers, including:
  a plate extending in a longitudinal direction, between a first lateral edge bearing first removable attachment means to a lateral wall of the compartment and a second free lateral edge, and
  a central leg extending between a first end connected to the plate and a second end comprising second removable attachment means to the floor of the compartment, characterized in that:
  the first end of the central leg is connected to the plate through a pivot connection allowing pivoting of the central leg for folding it back towards one of the first or second lateral edges of the plate,
  the plate includes, at the other one of the first and second lateral edges of the plate, at least one supporting member on which the plate is intended to be supported when the plate is laid on the floor,
  and wherein the supporting member includes at least one roller or shoe, intended to be supported on the floor when the plate is laid on the floor, and the table is maintained by a second end of the folded back central leg.

The central leg is folded back on one side of the table so as to be able to be handled from its second end, the plate then being supported on the floor via the supporting member, by means of which it may be moved to the floor without being damaged.

The table, for which the central leg is folded back, is not very cumbersome, and its handling is facilitated, so that it may be moved by a single operator, and that the risks of impact against other elements of the compartment are reduced.

A removable table according to the invention may further include one or several of the following features, taken alone or according to all technically conceivable combinations.

The leg includes a gripping member at its second end.
  The supporting member has at least three supporting points delimiting an effective supporting surface area on which the table may rest in a vertical position, the table being shaped so as to have a centre of gravity, when the central leg is folded back and that the longitudinal direction of the plate is substantially aligned with a vertical direction, placed at right angles to this effective supporting surface area in the vertical direction.
  The plate includes an elongated central portion in the longitudinal direction, and at least one shelf, each shelf being rotationally mobile around a pivot connection, with an axis parallel to the longitudinal direction, with respect to the central portion, between a position of use and a folded-back position.
  The central leg bears at its first end, at least one mobile maintaining member between an abutment position, in which the maintaining member forms an abutment for the shelf in the folded-back position, preventing the displacement of this shelf from its folded-back position to its position of use, and a disengagement position in which the maintaining member frees the trajectory of the shelf, allowing displacement of the shelf from its folded-back position to its position of use.
  Each maintaining member is connected to the central leg, so that the maintaining member is in its abutment position when the central leg is folded back, and in its disengagement position when the central leg is deployed.
  Each maintaining member is formed with a plate secured to the central leg, extending perpendicularly to an axis of the pivot connection of the central leg.
  The removable table comprises two maintaining members, positioned on either side of the central portion of the plate.

The invention also relates to a railway vehicle including a compartment for passengers, characterized in that the compartment for passengers is equipped with at least one removable table as defined earlier.

BRIEF DESCRIPTION OF THE DRAWINGS

The invention will be better understood upon reading the description which follows, only given as an example and made with reference to the appended figures, wherein.

DETAILED DESCRIPTION OF PREFERRED EMBODIMENTS

Figure 1:
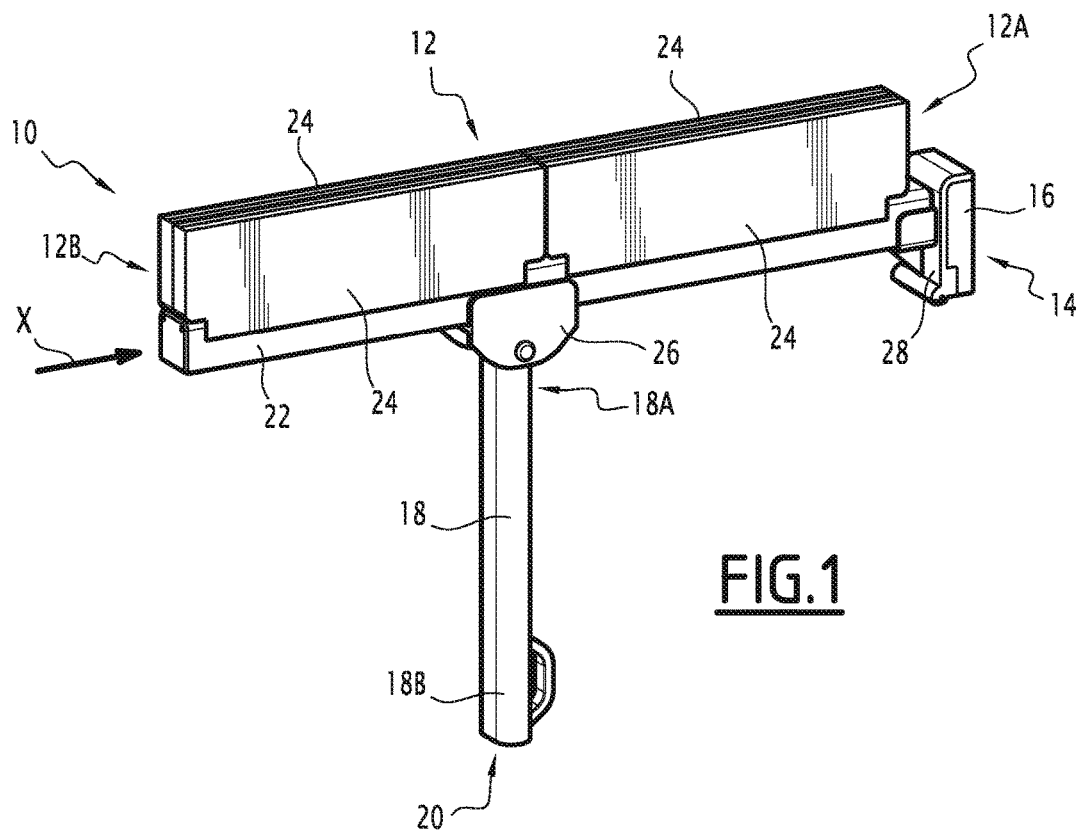
FIG. 1 is a perspective view of a removable table according to an exemplary embodiment of the invention, in a deployed leg configuration.

A removable table 10 has been illustrated in FIG. 1, intended to equip a compartment, namely a passenger compartment of a public transport vehicle, and more particularly a passenger compartment of a railway vehicle, for example a restaurant compartment.

Table 10 includes a plate 12 extending in a longitudinal direction X between a first lateral edge 12A including first removable attachment means 14 intended to be attached to a sidewall of the compartment, and a second free lateral edge 12B.

The first removable attachment means 14 namely allow attachment to a fixed lateral support 16 secured to the lateral wall of the compartment. These first removable attachment means 14 are of any conceivable standard type, and will therefore not be described in more detail.

Moreover, the table 10 includes a central leg 18 extending between a first end 18A connected to the plate 12 and a second end 18B comprising second removable attachment means 20 to the floor of the compartment, and more particularly to a fixed support (not shown) secured to the floor of the compartment. The second attachment means 20 are of any conceivable standard type, and will therefore not be described in more detail.

The first end 18A of the central leg 18 is connected to the plate 12 through a pivot connection 26, allowing pivoting of the central leg 18 for folding it back towards one of the first 12A or second 12B lateral edges of the plate 12. In the example, the central leg 18 may be folded back towards the second lateral edge 12B. Advantageously, the pivot connection 26 includes means for blocking the displacement of the central leg 18 towards the other lateral edge, so that the pivoting of the central leg 18 is only allowed towards one of the first 12A or second 12B lateral edges of the plate 12, and blocked towards the other one of the first 12A or second 12B lateral edges.

In other words, the central leg 18 is movable around the pivot connection 26, between a deployed position and a folded-back position.

According to the described embodiment, the plate 12 includes a central portion 22 elongated in the longitudinal direction X, and at least one shelf 24 which may be folded back. For example, in the described example, the plate 12 includes two shelves 24 on either side of the central portion 22, therefore a total of four shelves 24.

Each shelf 24 is rotationally movable around a pivot connection with an axis parallel to the longitudinal direction X, relatively to the central portion 22, in a position of use and a folded-back position.

A shelf 24 in the position of use substantially extends horizontally, perpendicularly to the deployed leg 18. The shelf 24 is in a position of use when a user wishes to use it.

A shelf 24 in the folded-back position extends in a plane forming a non-zero angle with the plane in which extends the shelf in the position of use, for example with an angle of 90°. The shelf 24 is then substantially parallel to the leg 18. The shelf 24 is in a folded-back position when it is not used, so as to be less cumbersome. The shelf 24 is also in a folded-back position when it is desired to move the table 10.

The folded-back position is the one illustrated in FIG. 1. In this folded-back position, the shelves 24 are positioned facing each other, for example parallel with each other.

The plate 12 includes, at the other one of the first 12A or second 12B lateral edges, therefore in the example illustrated at the first lateral edge 12A, at least one supporting member 28 on which the plate 12 is intended to be supported when the plate 12 is laid on the floor. It is stated that the plate 12 rests on the floor when it rests on the floor without passing via the leg 18.

It should be noted that the supporting member 28 includes the first attachment means 14 in the illustrated example.

The supporting member 28 includes at least one roller 30 or a shoe, intended to be supported on the floor when the plate is laid on the floor and the table 10 is maintained by an operator at the second end 18B of the folded back central leg 18.

Thus, when the supporting member 28 is laid on the floor and that the table is maintained at the second end 18B of the folded-back leg 18, it is possible to move the table by having it roll on the roller 30 or slide on the shoe 30, which considerably facilitates the displacement of the table 10, which may be achieved by a single operator.

Figure 2:
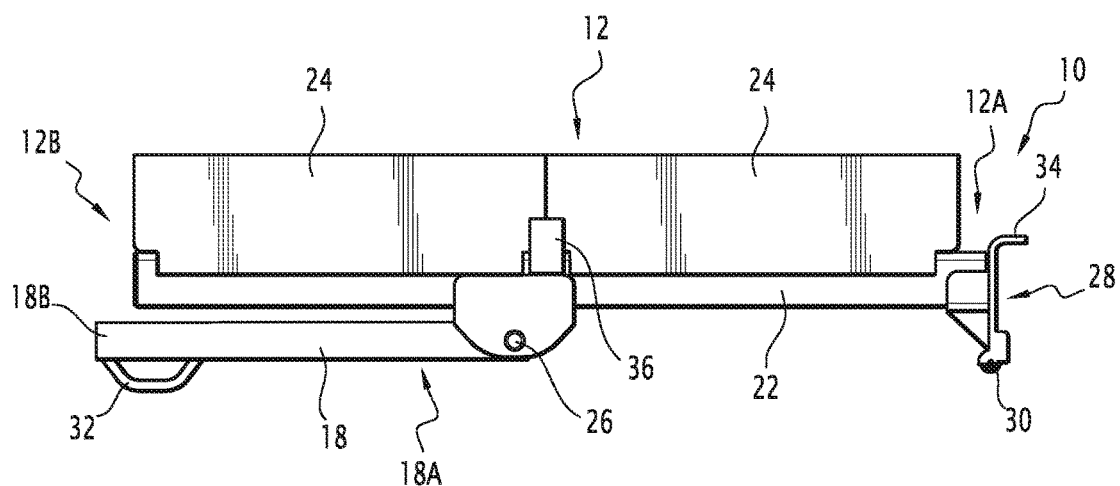
FIG. 2 is a profile view of the removable table of FIG. 1, in a folded back leg configuration.

Advantageously, as this is illustrated in FIG. 2, the leg 18 includes a gripping member 32 at its second end 18B, facilitating the maintaining and handling of the table through this second end 18B when the central leg 18 is folded back.

Advantageously, the supporting member 28 has at least three supporting points, at least one of which is formed by each roller or shoe 30. The other supporting points are for example borne by a rod 34. These supporting points together delimit an effective supporting surface area, on which the table 10 may rest in a vertical position, i.e. when the longitudinal direction X of the plate 12 is substantially aligned with a vertical direction.

In order to be stable on this effective supporting surface, the table 10 is shaped so as to have a center of gravity, when the central leg 18 is folded back and when the longitudinal direction X of the plate 12 is substantially aligned with the vertical direction, positioned at right angles from this effective supporting surface in the vertical direction. When the plate 12 includes shelves 24, the relevant centre of gravity is that of the table when the shelves 24 are in a folded-back position. Thus, the folded-back table 10 may be easily stored away without any risk of falling, by vertically resting on the supporting member 28.

Advantageously, as this is illustrated in FIG. 2, the central leg 18 includes at its first end 18A, at least one maintaining member 36 forming an abutment for at least one of the shelves 24 in a folded-back position when the leg 18 is folded back. This maintaining member 36 gives the possibility of preventing displacement of the shelves 24 from their folded-back position to their position of use when the leg 18 is folded back (abutment position). On the other hand, when the leg 18 is deployed, the maintaining member 36 is kept away from the shelves 24 in order to clear the trajectory of these shelves 24 and allow their movement from their folded back position to their position of use (disengagement position).

For example, the table 10 includes two maintaining members 36 laid out on either side of the central portion 22 of the plate, each maintaining member 36 being formed by a maintaining portion secured to the central leg 18, extending perpendicularly to the axis of the pivot connection 26 of the central leg 18. Each maintaining portion 36 being secured to the central leg 18, it pivots in the same way around the pivot connection 26 between its abutment position and its disengagement position.

The handling of the table 10 by an operator during a movement of this table 10 will now be described.

Firstly, the shelves 24 are folded back into their folded-back position, in order to have minimum congestion.

The first 14 and second 20 removable attachment means are deactivated for detaching the table 10 from the lateral wall and from the floor.

The central leg 18 is then folded back, causing displacement of the maintaining members 36 towards their abutment positions, so that the shelves 24 are immobilized in their folded-back positions.

The supporting member 28 of the plate 12 is laid on the floor, the table 10 being maintained by the operator at the second end 18B of the folded back central leg 18, more particularly by the gripping member 32.

The table 10 may thus be easily transported, by rolling on the rollers 30 (or sliding if these are shoes 30), as far as a storage location or a location where it will be again mounted.

In the case of storage, the table 10 is positioned in a stable way vertically by resting on the supporting member 28.

In the case of mounting, the table 10 is unfolded by deploying the leg 18, thereby releasing the shelves 24, and the table is then attached to the lateral wall and to the floor in a conventional way.

It will be noted that the invention is not limited to the embodiment described earlier, and may have diverse alternatives without departing from the scope of the claims.

For example, the plate 12 may not include any mobile portion, or exclusively include two movable shelves positioned on either side of the central portion or further a single shelf.

A maintaining member 36 which is not secured to the leg 18, but which may be activated independently of the leg 18, may also be provided.

The invention claimed is:

1. A removable table for a room, comprising:
   a plate extending in a longitudinal direction, between a first lateral edge bearing first removable attachment means to a lateral wall of the compartment, and a second free lateral edge, and
   a central leg extending between a first end connected to the plate and a second end comprising second removable attachment means to the floor of the compartment, wherein,
   the first end of the central leg is connected to the plate through a pivot connection allowing pivoting of the central leg for folding it back towards one of the first or second lateral edges of the plate,
   the plate includes, at the other one of the first or second lateral edges of the plate, at least one supporting member on which the plate is intended to be supported when the plate is laid on the floor, and
   the supporting member includes at least one roller or a shoe, intended to bear upon the floor when the plate is laid on the floor, and that the table is maintained by the second end of the folded back central leg.

2. The removable table according to claim 1, wherein the leg includes a gripping member at its second end.

3. The removable table according to claim 1, wherein the supporting member has at least three supporting points delimiting an effective supporting surface area on which the table may rest in a vertical position, the table being shaped in order to have a centre of gravity, when the central leg is folded back and that the longitudinal direction of the plate is substantially aligned with a vertical direction, positioned at right angles to this effective supporting surface area in the vertical direction.

4. The removable table according to claim 1, wherein the plate includes a central portion elongated in the longitudinal direction, and at least one shelf, each shelf being rotationally movable around a pivot connection, with an axis parallel to the longitudinal direction, relatively to the central portion, between a position of use and a folded-back position.

5. The removable table according to claim 4, wherein the central leg bears, at its first end, at least one maintaining member movable between an abutment position, in which the maintaining member forms an abutment for the shelf in the folded-back position, preventing displacement of this shelf from its folded-back position to its position of use, and a disengagement position in which the maintaining member clears the trajectory of the shelf, allowing displacement of the shelf from its folded-back position to its position of use.

6. The removable table according to claim 5, wherein said at least one maintaining member is connected to the central leg, so that the maintaining member is in its abutment position when the central leg is folded back, and in its disengagement position when the central leg is deployed.

7. The removable table according to claim 6, wherein said at least one maintaining member is formed by a maintaining portion secured to the central leg, extending perpendicularly to an axis of the pivot connection of the central leg.

8. The removable table according to claim 5, comprising two maintaining members positioned on either side of the central portion of the plate.

9. The removable table according to claim 1, wherein the room is public transport vehicle passenger compartment.

10. A railway vehicle including a compartment for passengers, wherein the compartment for passengers is equipped with at least one removable table according to claim 1.

* * * * *